No. 835,315. PATENTED NOV. 6, 1906.
J. H. OSBORNE.
CHEESE CUTTER.
APPLICATION FILED NOV. 21, 1903.
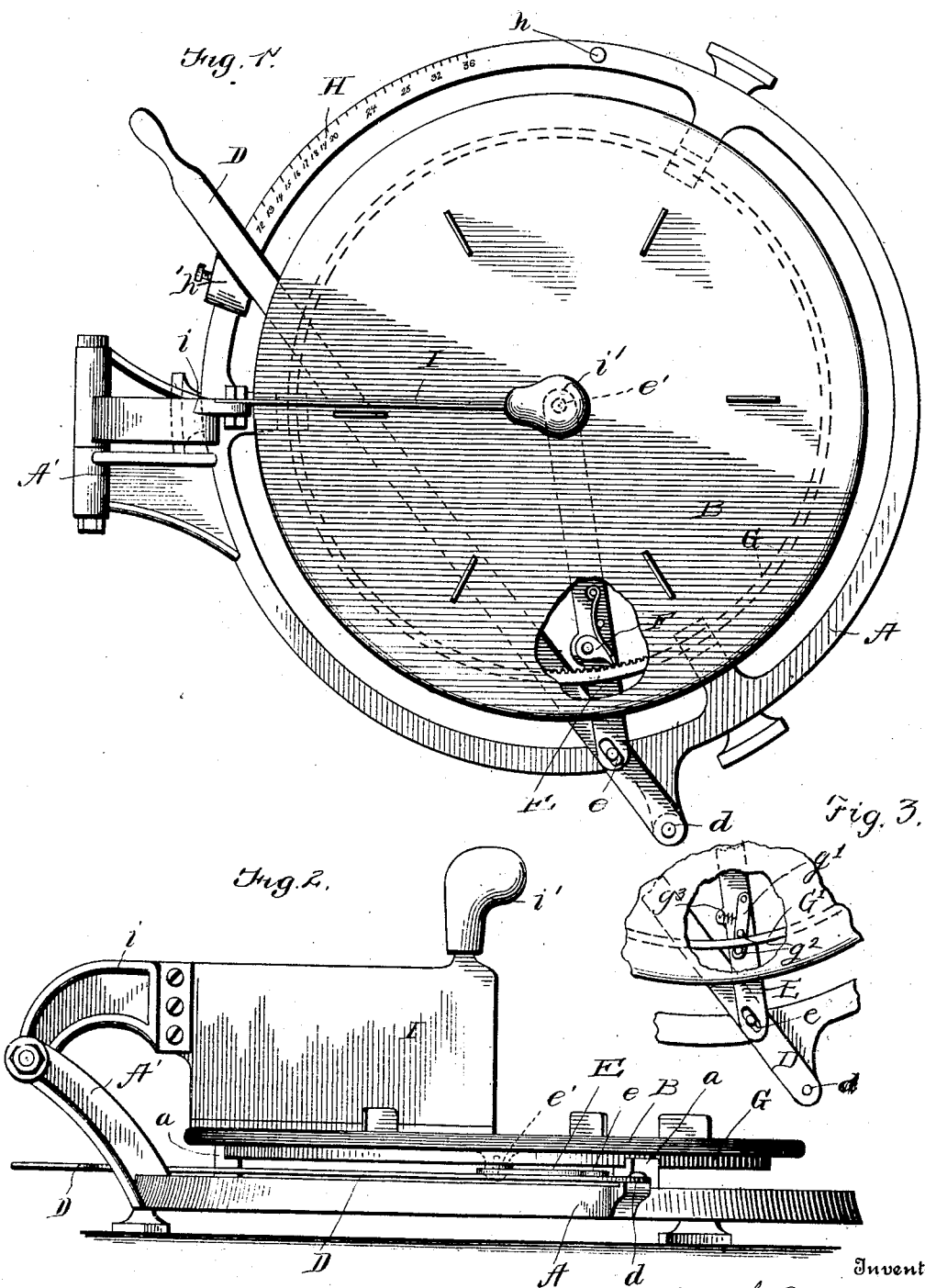
Witnesses
R. A. Boswell
George M. Anderson
Inventor
John H. Osborne
By E. W. Anderson
his Attorney

UNITED STATES PATENT OFFICE.

JOHN H. OSBORNE, OF ANDERSON, INDIANA.

CHEESE-CUTTER.

No. 835,315. Specification of Letters Patent. Patented Nov. 6, 1906.

Application filed November 21, 1903. Serial No. 182,191.

*To all whom it may concern:*

Be it known that I, JOHN H. OSBORNE, a citizen of the United States, and a resident of Anderson, in the county of Madison and State of Indiana, have made a certain new and useful Invention in Cheese-Cutters; and I declare the following to be a full, clear, and exact description of the same, such as will enable others skilled in the art to which it appertains to make and use the invention, reference being had to the accompanying drawings, and to letters of reference marked thereon, which form a part of this specification.

Figure 1 is a plan view of my cheese-cutter, broken away to show the device for rotating the table. Fig. 2 is a side elevation of the same. Fig. 3 is a detail view illustrating a modified form of gripping connection between the table and operating-lever.

This invention has relation to cheese-cutters, and has for its object the provision of a device of simple and efficient character for cutting up a cheese in blocks of any desired size.

With this object in view the invention consists in the novel construction and combination of parts, all as hereinafter described, and pointed out in the appended claims.

Referring to the accompanying drawings, the letter A designates a base-frame; B, a rotary table adapted to carry the cheese and resting upon supporting-lugs $a$ of said base, the cheese being weighed before being placed upon table B.

In order to rotate the table and cheese to cut the desired amount of cheese at each stroke of the knife, the following means are provided: D is an operating-lever for rotating the table B, such lever being pivoted circumferentially to an outer extension B' of the base-frame at the rear thereof at $d$ and extending eccentrically chordwise across and beyond the forward side of said frame, upon which it rests, and underneath the table, the free end of said lever having a handle portion. E is an arm having a slot-and-pin connection with the rear end portion of said lever at $e$ and pivoted to the center of and underneath the table at $e'$. F is a spring-pawl intermittent grip device pivoted to the outer end portion of arm E and having an engagement with toothed ring G, carried by table B, whereby upon operation of the lever D the table will be rotated to an extent proportionate to the movement of lever D. This lever works in connection with a series of total cheese-weight graduations H, marked upon the rim of the frame A. A fixed stop $h$ limits the movement of such lever in one direction, while a movable stop $h'$, removably engaging the base-frame opposite the graduations H, limits the extent of movement of the lever. The proper position of adjustable stop $h'$ is previously calculated, so that a piece of cheese of predetermined weight will be measured off at each stroke of the lever. It will be understood that the stroke of the lever is determined by the total weight of the cheese, each full stroke measuring off, say, one-quarter pound, so that the heavier the cheese the shorter will be the stroke of the lever. Hence the necessity of making one of the stops adjustable along a total-weight scale.

Referring now to the cutting means, I is the knife-blade, secured at its outer end to lever $i$, extending downwardly and outwardly to meet and pivotally connected with upwardly and outwardly extending frame-lug A' of base A, the lever $i$ terminating outside the periphery of table B, whereby the knife in its stroke will not be interfered with by said lever. The knife when lowered terminates at the center of table A and carries at its free end an upwardly-projecting handle $i'$.

In place of the toothed ring or gear-wheel G and spring-pawl F, I may employ a smooth ring G' and a gripping device $g'$, pivoted to arm E and having upright pins $g^2$ embracing the ring G', as shown in Fig. 3, a spring $g^3$ acting to hold device $g'$ in clamping position.

It will be seen that spring $g^3$ presses the clutch-carrying plate in the direction of the actuating stroke and that one of the grip-pins is in advance of the other, so that the clutch will at all times except on the reverse stroke of the operating-arm closely grip the depending rim, thereby taking up all lost motion and insuring practical accuracy in operation.

It will be observed that an important advantage is derived by pivoting the operating-lever at a point considerably beyond the center of the table from the side at which the handle end of the lever projects. This arrangement gives an augmented throw of the handle portion, or that portion which works along the scale-plate—that is, for a given movement of the table the projecting portion of the lever will move farther and faster than the periphery of the table. This enables me to use a scale having larger graduations—i. e., graduations set farther apart—than would be the case were the lever pivoted at or near the center of the table, so as to rotate in unison with it. Where the lever is pivoted at or near the center, it necessarily travels the same distance as the table to measure off a given quantity of cheese, so that particularly when a heavy cheese is being measured off and a fraction of a pound only is desired the movement of the table will be necessarily comparatively slight, as the slice must be cut comparatively thin. This, as is obvious, will require, to attain the necessary accuracy, that a very fine scale be used and that all lost motion be eliminated and that the clutch shall operate with a great degree of accuracy; but by giving the lever, or that part of it which works in conjunction with the scale, an augmented throw a much greater degree of accuracy is obtainable with a given degree of skill and care in the construction of the table-operating devices.

It will be observed, further, that by employing a radial actuating-arm extending backwardly and a lever pivoted to the base underneath said arm I secure not only very compact and durable and practical table-actuating means, but am also enabled to secure the desired augmented throw of the handle end of the lever, as above described. By employing an arm concentric with the table accuracy is obtained without mounting the table clutch or pawl movably upon the arm.

Having thus described my invention, what I claim as new, and desire to secure by Letters Patent, is—

1. In a cheese-cutter, a base-frame having a series of cheese-weight graduations, a rotary table, an operating-lever pivoted to one side of said frame and projecting beyond its opposite side over said series of graduations, a ring carried by said table, an arm having a pin-and-slot connection with said lever and pivoted to the center of the machine, and a spring gripping-arm pivoted to said arm and having a forked portion embracing said ring, substantially as specified.

2. A cheese-cutter having in combination, a base-frame having an outer extension at one side thereof, a scale at the opposite side of said frame, a rotary table, its ring-bearing, a table-rotating lever pivoted to said outer extension at one side, extending across the base, and projecting over said scale, a radial arm pivoted to said lever, an intermittent grip device connected to said arm and engaging the ring-bearing, and an adjustable stop upon the scale for limiting the movement of the lever, substantially as specified.

3. In a cheese-cutter, the combination of the base and a rotary table mounted thereon, an operating-lever pivoted to the base at one side of the table and extending under the table and beyond its opposite edge, an arm pivoted to the base-frame concentrically with the table and carrying a clutch for engaging the table on the actuating stroke, and means for pivotally connecting the outer end of the actuating-arm to the lever at a point inside of the pivot of the lever.

4. In a cheese-cutter, the combination of the base and a rotary table mounted thereon, an operating-lever pivoted to the base at one side and extending under the table to the other side of the base, a clutch-carrying arm pivoted at its inner end to the base concentrically with the table, said arm having a pin-and-slot connection at its outer end with the lever, and stops on the frame for limiting the throw of the lever, substantially as set forth.

5. In a cheese-cutter, the combination of a base and a rotary cheese-table mounted thereon, an operating-lever pivoted to the base at one side of the table and extending under the table and beyond its opposite edge, an arm pivoted to the base-frame concentrically with the table and carrying a device adapted to engage the table on the actuating stroke, and means for pivotally connecting the arm to the lever inside the fulcrum of the lever.

6. In a cheese-cutter, the combination of a base and a rotary cheese-table mounted thereon, an operating-lever pivoted to the base at one side of the table and extending under the table and beyond its opposite edge, an arm pivoted to the base-frame concentrically with the table and carrying a device adapted to engage the table on the actuating stroke, and means for pivotally and slidingly connecting the arm to the lever inside the fulcrum of the lever.

7. In a computing cheese-cutter, the combination of a base and a rotary table mounted thereon, an arm pivoted to the base concentrically with the table and carrying at its free end means adapted to engage the table on the actuating stroke, a lever pivoted to the base at one side and extending beyond the other side, scale means at the projecting end of the lever for controlling the movements thereof, and means pivotally connecting the arm to the lever at a point to one side of its pivot.

8. In a computing cheese-cutter, the combination of a base and a rotary table mounted thereon, an arm pivoted to the base concentrically with and underneath the table and carrying at its free end means adapted to engage and actuate the table, a lever pivoted to the base underneath the arm at one side of the base, scale means at the projecting end of the lever for controlling the movements thereof, and means for pivotally connecting the lever at one side of its pivot to the free end of the arm.

9. In a computing cheese-cutter, the combination of a base and a rotary table mounted thereon, an arm pivoted on the base concentrically with and underneath the table and extending backwardly and carrying at its free end means adapted to engage and actuate the table, a lever pivoted underneath the arm to the base and extending beyond the opposite side of the table, scale means at the projecting end of the lever for controlling its movements, and means for pivotally connecting the lever to the free end of the arm.

10. In a computing cheese-cutter, the combination of a base and a rotary table mounted thereon, an arm pivoted to the base concentrically with the table and carrying at its free end means adapted to engage and actuate the table, a lever pivoted to the base underneath the table and having its free end projecting beyond the edge of the table, means pivotally connecting the lever at a point to one side of its fulcrum to the free end of the arm, and scale means on the base beyond the table for controlling the movements of the lever.

11. In a computing cheese-cutter, the combination of a base and a rotary table mounted thereon, an arm pivoted to the base concentrically with the table and carrying at its free end means adapted to engage and actuate the table, a lever pivotally mounted on the base and carrying means movably connecting it to said arm, said means lying under the arm at the point of engagement therewith, and scale means on the base for controlling the movements of said lever.

In testimony whereof I affix my signature in presence of two witnesses.

JOHN H. OSBORNE.

Witnesses:
   HERBERT C. EMERY,
   GEORGE M. ANDERSON.